United States Patent
Cardozo et al.

(10) Patent No.: US 12,299,430 B2
(45) Date of Patent: May 13, 2025

(54) PARALLEL ROLLOUT VERIFICATION PROCESSING FOR DEPLOYING UPDATED SOFTWARE

(71) Applicant: Capital One Services, LLC, McLean, VA (US)

(72) Inventors: Kenneth Cardozo, Flower Mound, TX (US); Tausif Shahid, Frisco, TX (US); Sai Pradeep Kurakula, Allen, TX (US); Saira Zaman, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 456 days.

(21) Appl. No.: 17/446,787

(22) Filed: Sep. 2, 2021

(65) Prior Publication Data
US 2023/0061613 A1   Mar. 2, 2023

(51) Int. Cl.
*G06F 8/65* (2018.01)
*G06F 8/71* (2018.01)
*H04L 67/00* (2022.01)

(52) U.S. Cl.
CPC ............... *G06F 8/65* (2013.01); *G06F 8/71* (2013.01); *H04L 67/34* (2013.01)

(58) Field of Classification Search
CPC .............. G06F 8/65; G06F 8/71; H04L 67/34
See application file for complete search history.

(56) References Cited

U.S. PATENT DOCUMENTS

| | | | |
|---|---|---|---|
| 7,555,551 B1 | 6/2009 | McCorkendale et al. | |
| 8,756,318 B1* | 6/2014 | Reus | G06F 15/16 |
| | | | 709/225 |
| 8,856,361 B2* | 10/2014 | Friedman | H04L 63/10 |
| | | | 709/227 |
| 8,881,139 B1* | 11/2014 | Acacio | G06F 8/76 |
| | | | 717/177 |
| 9,087,156 B2* | 7/2015 | Patton | G06F 8/61 |
| 9,311,066 B1* | 4/2016 | Garman | G06F 8/65 |
| 9,710,250 B2* | 7/2017 | Johnson | G06F 8/65 |
| 10,061,690 B2* | 8/2018 | Cho | G06F 11/3692 |
| 2007/0180325 A1* | 8/2007 | Bailey | H04L 43/50 |
| | | | 714/38.1 |
| 2008/0282112 A1* | 11/2008 | Bailey | H04L 41/145 |
| | | | 714/38.11 |
| 2016/0028598 A1* | 1/2016 | Khakpour | H04L 43/50 |
| | | | 709/224 |

(Continued)

*Primary Examiner* — Lewis A Bullock, Jr.
*Assistant Examiner* — Theodore E Hebert
(74) *Attorney, Agent, or Firm* — Harrity & Harrity, LLP (57) ABSTRACT

In some implementations, a rollout component may deploy, in a pilot mode, an updated version of a software application in a runtime environment executing a legacy version of the software application. The rollout component may process requests in a request queue using the legacy version to generate processing results that are dispatched to a client interface and may process, using the updated version, copies of the requests processed by the legacy version. The rollout component may indicate whether the updated version passes one or more tests based on a comparison between the validation data generated by the updated version and processing results generated by the legacy version. The rollout component may switch the updated version from the pilot mode to a live mode based on the updated version passing the one or more tests.

20 Claims, 6 Drawing Sheets

(56) References Cited

U.S. PATENT DOCUMENTS

| | | | |
|---|---|---|---|
| 2016/0078327 A1* | 3/2016 | Wakamatsu | G06F 11/36 |
| | | | 358/1.15 |
| 2017/0192873 A1* | 7/2017 | Ozdemir | G06F 8/658 |
| 2018/0004646 A1* | 1/2018 | Cho | G06F 11/3684 |
| 2018/0288138 A1* | 10/2018 | Venkiteswaran | H04L 47/125 |
| 2018/0336022 A1* | 11/2018 | Eberlein | G06F 8/71 |
| 2020/0026508 A1* | 1/2020 | Eapen | H04L 67/14 |
| 2020/0042298 A1* | 2/2020 | Jain | G06F 11/1484 |
| 2021/0176167 A1* | 6/2021 | Shivananda | H04L 45/72 |
| 2023/0061613 A1* | 3/2023 | Cardozo | G06F 8/71 |

* cited by examiner

PARALLEL ROLLOUT VERIFICATION PROCESSING FOR DEPLOYING UPDATED SOFTWARE

BACKGROUND

Software deployment refers to various activities that make a software system or software application available to use. For example, software development generally includes a development phase, a testing phase, a release phase, an installation and activation phase, and/or an update phase, among other examples. During the update phase, an update process is typically performed to replace all or part of an earlier version of a software application with a newer version. When an update is applied to replace the earlier version with the newer version, the earlier version may be deactivated and/or uninstalled prior to installation of the newer version.

SUMMARY

Some implementations described herein relate to a system for testing and deploying an updated version of a software application. The system may include one or more memories and one or more processors coupled to the one or more memories. The one or more processors may be configured to deploy, in a pilot mode, the updated version of the software application in a runtime environment executing a legacy version of the software application. The one or more processors may be configured to process one or more requests in a request queue associated with the software application using the legacy version of the software application to generate processing results that are dispatched to a client interface and a communication history that includes one or more records based on the processing results dispatched to the client interface. The one or more processors may be configured to process, using the updated version of the software application, copies of the one or more requests processed by the legacy version of the software application to generate validation data based on the one or more records included in the communication history. The one or more processors may be configured to generate one or more outputs that indicate whether the updated version of the software application passes one or more tests associated with the one or more requests in the request queue based on a comparison between the validation data generated by the updated version of the software application and the one or more records included in the communication history.

Some implementations described herein relate to a method for testing an updated version of a software application in a live runtime environment prior to deployment. The method may include deploying, by a device, the updated version of the software application in a runtime environment executing a legacy version of the software application, where the updated version of the software application is deployed in a pilot mode. The method may include processing, by the device, one or more requests in a request queue associated with the software application using the legacy version of the software application to generate processing results that are dispatched to a client interface and a communication history that includes one or more records based on the processing results dispatched to the client interface. The method may include processing, by the device, using the updated version of the software application, copies of the one or more requests processed by the legacy version of the software application to generate validation data based on the one or more records included in the communication history. The method may include generating, by the device, one or more outputs that indicate whether the updated version of the software application passes one or more tests associated with the one or more requests in the request queue based on a comparison between the validation data generated by the updated version of the software application and the one or more records included in the communication history. The method may include switching, by the device, the updated version of the software application from the pilot mode to a live mode based on the one or more outputs indicating that the updated version of the software application passes the one or more tests associated with the one or more requests in the request queue.

Some implementations described herein relate to a non-transitory computer-readable medium that stores a set of instructions for a system. The set of instructions, when executed by one or more processors of the system, may cause the system to deploy, in a pilot mode, an updated version of a software application in a runtime environment executing a legacy version of the software application. The set of instructions, when executed by one or more processors of the system, may cause the system to process one or more requests in a request queue associated with the software application using the legacy version of the software application to generate processing results that are dispatched to a client interface and a communication history that includes one or more records based on the processing results dispatched to the client interface. The set of instructions, when executed by one or more processors of the system, may cause the system to process, using the updated version of the software application, copies of the one or more requests processed by the legacy version of the software application to generate validation data based on the one or more records included in the communication history. The set of instructions, when executed by one or more processors of the system, may cause the system to generate one or more outputs that indicate whether the updated version of the software application passes one or more tests associated with the one or more requests in the request queue based on a comparison between the validation data generated by the updated version of the software application and the one or more records included in the communication history. The set of instructions, when executed by one or more processors of the system, may cause the system to modify a data pipeline associated with the updated version of the software application based on the one or more outputs indicating that the updated version of the software application passes the one or more tests associated with the one or more requests in the request queue.

DETAILED DESCRIPTION

The following detailed description of example implementations refers to the accompanying drawings. The same reference numbers in different drawings may identify the same or similar elements.

Software applications are often designed to perform one or more actions to implement or otherwise provide a service to one or more users that interact with the service via one or more computing devices. When software is developed, tested, released, updated, and/or put into production, the software may go through multiple iterations, or versions, and may be developed in various environments, using various frameworks, and/or for various hardware configurations. For example, in some cases, a software application may be deployed in a production environment, which may include one or more nodes in a data center in a network environment that one or more client devices access in order to interact with the software application. In some cases, because the production environment may include many nodes that are running the software application and/or many client devices accessing the software application, rolling out updates to replace an earlier or "legacy" version of a software application with a newer or "updated" version of the software application tends to be a challenging process to ensure that the updated version has been fully tested for compatibility with the legacy version and/or to minimize or eliminate downtime or unavailability that may occur when deactivating or uninstalling the legacy version and/or installing or activating the updated version.

For example, existing techniques used to release a new software version into a production environment and route traffic to the new software version tend to focus on identifying problems with the new software version early in a development cycle such that the new version can be safely deployed into the production environment with a minimal impact (e.g., minimal or no downtime). Accordingly, existing techniques generally require a capability to roll back changes in the event problems arise after the new version has been deployed to ensure continuity for any client devices that may be interacting with the application or consuming a service provided by the application. Existing techniques to deploy software updates therefore tend to suffer from various drawbacks, including problems with the updated version that may not be discovered until after the updated version has been at least partially deployed and enabled in the production environment. For example, in a rolling deployment technique, a new or updated version of a software application may be deployed to a server cluster, one server at a time. Provided that no issues are discovered with the new version, deployment may continue across the production environment hosting the application until all servers are running the updated version. Similarly, in a canary deployment, a software update is typically rolled out in staged releases, where certain users (rather than certain servers) are targeted to receive access to the updated version using throttling features and the update is later rolled out to other users if testing and/or feedback provided by the targeted users indicates that the updated version is working correctly. In another technique, a blue-green deployment may be performed in a production environment where one pipeline feeds to two identical regions, which include an active (e.g., green) region and an idle (e.g., blue) region. In the blue-green deployment technique, one region runs the earlier version being updated and one region runs the updated version, and traffic may be switched from the region running the earlier version to the region running the updated version. In still another example, a programmatic toggle may be used, where new features may be turned on and/or off using a configurable flag.

In general, the various existing deployment techniques mentioned above suffer from the drawback that the updated version is partially released into the production environment, with at least some live traffic routed to the updated version, which may result in an end user impact in cases where one or more problems are discovered after the updated version has been partially released on one or more servers and/or to one or more users. Furthermore, a blue-green deployment carries a high resource cost, because every resource that the application depends upon (e.g., including servers, virtual machines, containers, configurations, and/or databases, among other examples) has to be duplicated in the active region and the idle region. However, efforts to improve, modernize, streamline, change, or otherwise update a software application generally depend on thorough testing and validations that can only be fully vetted in a production environment. For example, in applications that deal with many different use cases or scenarios, manual testing may be insufficient to cover all potential use cases or scenarios. Accordingly, existing techniques to deploy software updates generally lack a capability to test an updated version of a software application using live inputs and/or data while also minimizing any end user impact or downtime in cases where one or more issues are discovered during testing.

Some implementations described herein relate to performing parallel rollout verification processing for an updated version of a software application in a pilot or testing mode prior to deploying the updated version of the software application in a live or production mode. For example, in some implementations, the updated version of the software application may be deployed in the pilot mode in a runtime environment that is executing a legacy version of the software application (e.g., an earlier version to be updated). In some implementations, the runtime environment may be connected to one or more data sources and to a central data store accessible via a client interface, where the software application reads data from and/or writes data to the central data store. When the updated version of the software application is running in the pilot mode, the runtime environment may receive live inputs and/or data from the one or more data sources, and a data pipeline may be configured such that the live inputs and/or data are processed using the legacy version of the software application to generate processing results (e.g., read and/or write commands) that are dispatched to the central data store. Furthermore, in the pilot mode, copies of the live inputs and/or data processed using the legacy version may be provided to the updated version (e.g., as one or more callbacks), whereby the updated version may run in the same production environment as the legacy version to generate validation data based on processing the copies of the live inputs and/or data processed using the legacy version. In this way, the validation data may indicate how the updated version of the software application would have responded to the live inputs and/or data, whereby the validation data can be compared to the processing results dispatched to the central data store to determine whether the updated version is operating correctly. In this way, in cases where the comparison of the validation data and the processing results dispatched to the central data store indicate that the updated version is operating correctly, the data pipeline may be may modified to route live inputs and/or data received from the data sources to the updated version and to route processing results generated by the updated version to the central data store. Alternatively, in cases where the comparison of the validation data and the processing results dispatched to the central data store indicate one or more issues, the updated version may be subject to further debugging and/or development without having to roll back any changes because the updated version is not connected to the central data store accessed by client devices in the pilot mode.

Figure 1A:
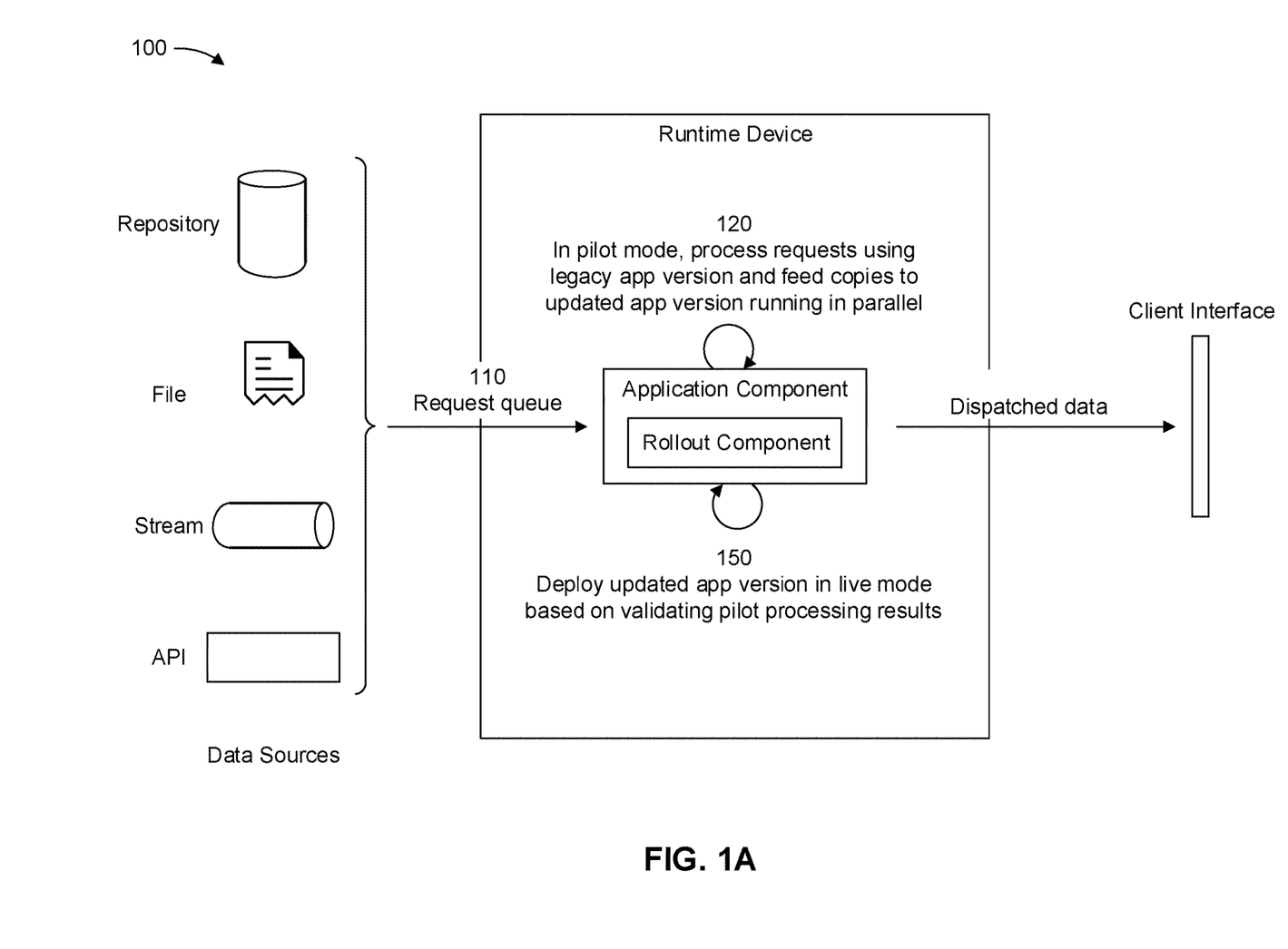
FIGS. 1A-1C are diagrams of an example associated with parallel rollout verification processing for deploying updated software.
Figure 1B:
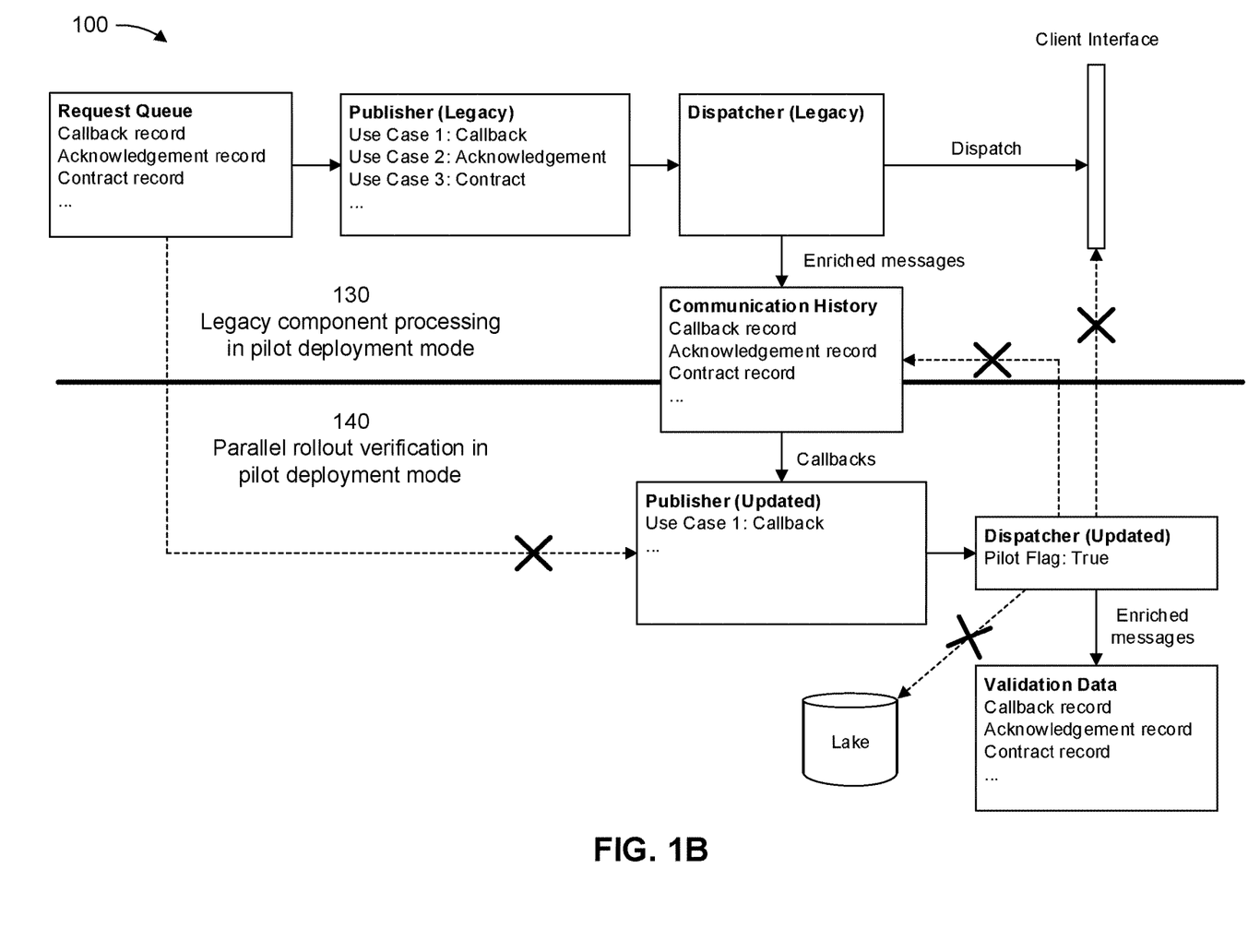
Figure 1C:
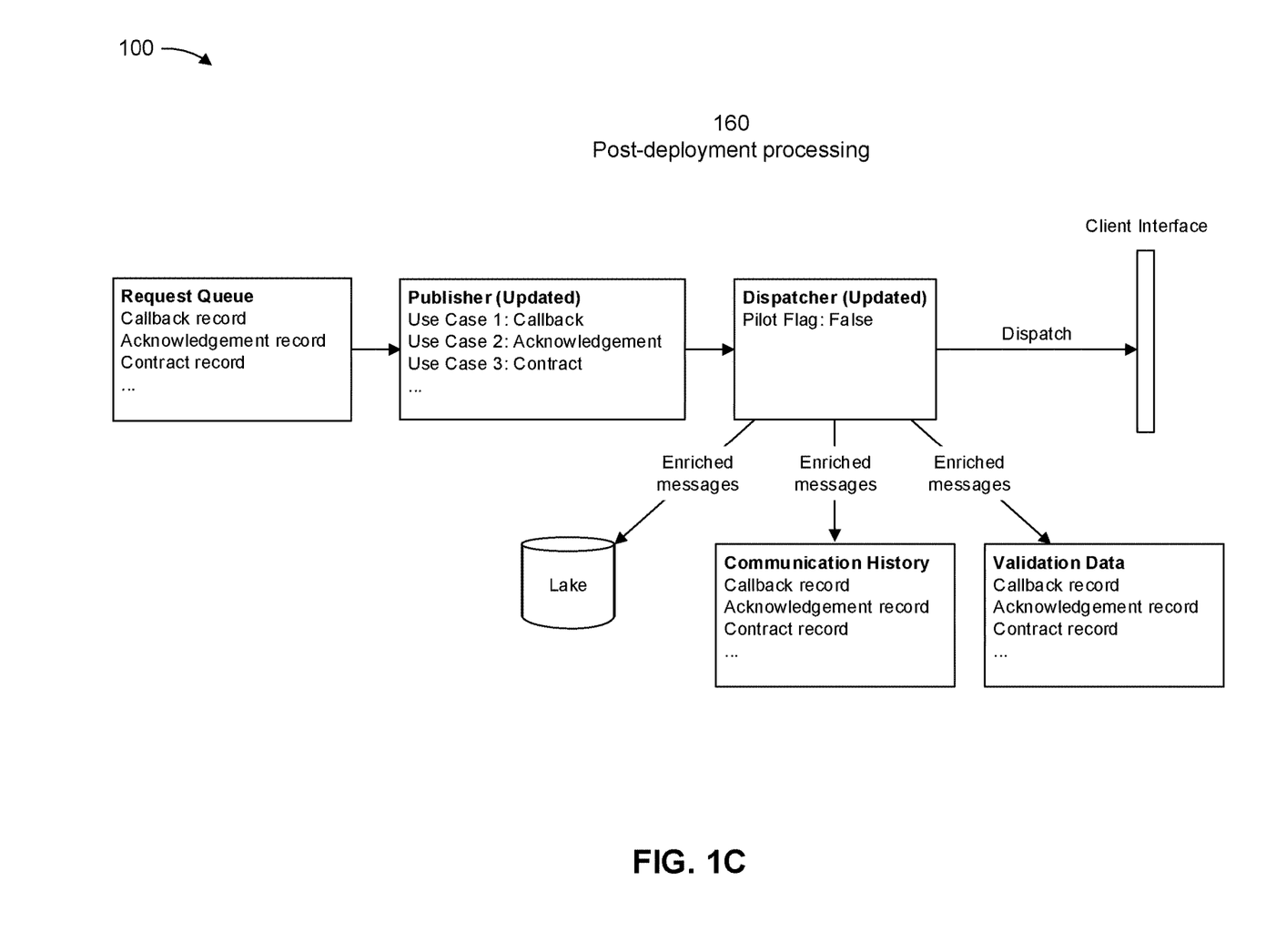

FIGS. 1A-1C are diagrams of an example 100 associated with parallel rollout verification processing for deploying updated software. As shown in FIGS. 1A-1C, example 100 includes a runtime device hosting an application component, one or more data sources connected to the runtime device, and a client interface connected to the runtime device. The devices shown in FIGS. 1A-1C are described in more detail in connection with FIG. 2 and FIG. 3.

In some implementations, the runtime device that hosts the application component may be provided in a production environment, such as a data center that includes one or more nodes that may execute one or more versions of a software application using the application component. For example, a current version of the software application that is accessible to one or more client devices (e.g., via the client interface) may be executed in a runtime environment provided by the runtime device and/or the application component. Furthermore, a subsequent iteration or version of the software application may be developed and deployed to the runtime environment, and a rollout component may be configured to perform parallel rollout verification processing for the subsequent iteration or version (which may be referred to herein as an "updated version") using live inputs and/or data routed to the current version of the software application (which may be referred to herein as a "legacy version"). For example, as described in further detail herein, the updated version of the software application may initially be deployed in a pilot mode (e.g., a testing mode) and executed in parallel with and in the same container as the legacy version of the software application. Furthermore, the rollout component may configure a data pipeline associated with the legacy version and the updated version to provide live inputs and/or data to the legacy version, and to provide copies of the live inputs and/or data to the updated version. Accordingly, the rollout component may compare processing results based on the legacy version processing the live inputs and/or data and validation data based on the updated version processing the copies of the live inputs and/or data to perform pre-rollout verification processing at any suitable validation stage without disrupting live data transactions and/or without causing any end user impact (e.g., no rollbacks) in cases where the updated version is discovered to have problems.

As shown in FIG. 1A, and by reference number 110, the runtime environment may obtain, from a request queue, one or more requests that originate from one or more data sources. For example, as shown, the one or more data sources may include one or more data repositories (e.g., one or more relational databases that provide a suitable application program interface (API) to enable access to the data stored in the one or more data repositories, such as a Java Database Connectivity (JDBC) API for a Java Archive (JAR) package file format used to aggregate Java class files and associated metadata and resources into one file for distribution). Additionally, or alternatively, as further shown, the one or more data sources may contain one or more files (e.g., flat files that include one or more records, with each record appearing in one line), one or more data streams (e.g., an ordered sequence of data records that map to a certain topic or message, such as a public and/or private Kafka stream), and/or one or more APIs that expose an endpoint associated with the software application (e.g., a get endpoint), among other examples.

As further shown in FIG. 1A, and by reference number 120, the one or more requests in the request queue may be processed using the legacy version of the software application when the updated version is deployed in the pilot mode, and copies of the requests in the request queue may be fed to the updated version of the software application that is running in parallel with the legacy version. For example, referring to FIG. 1B, reference number 130 illustrates legacy processing that may occur in the application component using the legacy version of the software application when the updated version of the software application is deployed in the pilot mode, and reference number 140 illustrates parallel rollout verification processing that may be performed in the application component using the updated version of the software application when the updated version of the software application is deployed in the pilot mode (e.g., in a testing or dormant mode where any processing results generated by the updated version of the software application are not dispatched to a client interface coupled to the runtime environment).

For example, as shown by reference number 130, the legacy version of the software application may include a publisher component that receives one or more records contained in a request queue and a dispatcher component configured to dispatch processing results to a client interface that is accessible by one or more client devices. In some implementations, the request queue generally includes one or more records that are based on live inputs and/or data that originate from the one or more data sources, and the publisher component is configured to obtain the records from the request queue, generate one or more Extensible Markup Language (XML) documents that include processing results associated with the records obtained from the request queue, and provide the XML documents to the dispatcher component. For example, in FIG. 1B, the request queue includes a callback record, an acknowledgement record, and a contract record, which the publisher component processes to generate corresponding XML documents (e.g., XML documents associated with a callback use case, an acknowledgement use case, and a contract use case) that are provided to the dispatcher component. As shown, the dispatcher component may be configured to dispatch the processing results associated with the XML documents to the client interface, and the dispatcher component may further write messages to a communication history to store records of the processing results dispatched to the client interface. Accordingly, as described herein, copies of the requests that are processed using the legacy publisher component and/or the legacy dispatcher component may be stored in the communication history and used as inputs to the updated version of the software application that is deployed in the pilot mode. Furthermore, the communication history may be used for auditing purposes (e.g., as proof of the record(s) dispatched to the client interface), to validate or otherwise determine whether the updated version of the software application is operating correctly (e.g., generating the same results as the legacy version).

As further shown in FIG. 1B, and by reference number 140, the updated version of the software application may include a publisher component and a dispatcher component that generally perform similar functions as the legacy publisher component and the legacy dispatcher component. However, as shown, the dispatcher component may be configured with a pilot flag that may be set to a first value (e.g., a Boolean value, such as true, or a binary value, such as one (1)) to indicate that the updated version of the software application is deployed in a pilot mode (e.g., a dormant state or another state in which processing results generated by the updated version of the software application are not dispatched, committed, or otherwise executed in the live production environment experienced by client devices). For example, as shown, the publisher component associated with the updated version of the software application may include an interface to receive inputs from the request queue, and the dispatcher component associated with the updated version of the software application may include an interface to dispatch processing results to the client interface, but such interfaces may be disabled in the pilot mode (e.g., as shown by dashed lines with cross marks).

Accordingly, in the pilot mode, the communication history that stores the records of the live inputs and/or data processed by the legacy version of the software application may be used as a source of requests to the updated publisher component. For example, as shown, one or more callbacks may be provided to the updated publisher component based on the records stored in the communication history (e.g., the callbacks may include executable code that is passed to the publisher component as one or more arguments, and the publisher component may be configured to execute the callbacks immediately in a synchronous callback mode or at a later point in time in an asynchronous callback mode). As shown, the updated publisher component may process the one or more callbacks, which may generally include or correspond to copies of the records in the request queue that serves as the source of requests processed by the legacy version of the software application. Accordingly, the records in the communication history may correspond to records or requests that have been successfully processed by the legacy version of the software application, and the records may serve as the source of requests to the updated version of the software application in the pilot mode. As further shown, the processing results generated by the publisher component may be provided to the dispatcher component, which may determine where to dispatch the processing results based on a status of the pilot flag. For example, in the pilot mode, the interface between the dispatcher and the client interface may be disabled, an interface between the dispatcher and the communication history may be disabled, and an interface between the dispatcher and a data lake that stores data in a natural or raw format (e.g., as binary large objects (blobs) or files) for consumption by one or more downstream components. Rather, in the pilot mode, the dispatcher may include an enabled interface with a validation repository (e.g., a Postgres table) that stores validation data based on the processing results generated by the updated publisher component and/or the updated dispatcher component.

In some implementations, when the updated version of the software application is deployed in the pilot mode, the rollout component may be configured to poll the communication history to obtain the copies of the live inputs and/or data processed by the legacy version of the software application. For example, in some implementations, the records stored in the communication history may include copies of the live inputs and/or data that are obtained from the request queue that serves as the source of requests for the legacy version of the software application when the updated version is deployed in the pilot mode. In this way, the rollout component may be used to obtain copies of the same inputs and/or data processed by the legacy version of the software application, which can be used to perform one or more tests to validate whether the updated version of the software application is behaving correctly. For example, in some implementations, the rollout component may be configured as a JAR or other package file format that can be deployed to the runtime environment hosting the legacy and updated versions of the software application, and the rollout component may be configured with one or more source types, access credentials, input sources, and/or polling frequencies to poll the communication history for the copies of the live inputs and/or data to be returned or otherwise provided to the updated publisher component (e.g., based on a JavaScript Object Notation (JSON) configuration).

Accordingly, the rollout component may be configured to compare the validation data that the updated dispatcher component writes to the validation table and the records stored in the communication history, and the rollout component may generate one or more outputs to indicate whether the updated version of the software application passes one or more tests associated with the one or more requests in the request queue. For example, each request in the request queue may represent an actual transaction that is processed by the legacy version of the software application, whereby discrepancies between the records that the legacy dispatcher component writes to the communication history and the records that the updated dispatcher component writes to the validation table may indicate erroneous or faulty operation for the updated version. In such cases, the one or more outputs generated by the rollout component may indicate that the updated version of the software application has failed the one or more tests, and a message may be sent to a development team to indicate the erroneous or faulty operation to be debugged or otherwise remediated. In this way, the updated version of the software application can be tested or validated using live inputs and/or data, and any problems with the updated version of the software application can be addressed without having to initiate any rollbacks (e.g., because the processing results generated by the updated dispatcher component are not routed to the client interface, the data lake accessed by downstream components, and/or the communication history that stores, for audit purposes, records of requests that are dispatched to the client interface). Furthermore, by running the updated version in parallel with the legacy version in the pilot mode and using live inputs and/or data to test the updated version, the updated version may be validated in a production environment without affecting any live users and/or transactions and without requiring concurrent versions or environments to be running in the production environment (e.g., as in a rolling, canary, blue-green, and/or toggle-based deployment pattern).

Alternatively, as shown in FIG. 1A, and by reference number 150, the updated version of the application may be deployed in or switched to a live mode based on the one or more outputs generated by the rollout component indicating that the updated version of the software application has passed the one or more tests. For example, referring to FIG. 1C, reference number 160 illustrates post-deployment processing performed by the updated version of the software application after the switch from the pilot mode to the live mode, where the rollout component may be configured to modify a data pipeline associated with the updated versions of the software application such that the request queue (rather than the communication history) serves as the source of requests for the publisher component associated with the updated version of the software application. As further shown, the pilot flag may be set to a second value (e.g., a Boolean value, such as false, or a binary value, such as zero (0)) to indicate that the updated version of the software application has been switched to the live mode. In such cases, various interfaces associated with the updated dispatcher component that are disabled in the pilot mode may be enabled when the updated version is deployed in or switched to the live mode. For example, in addition to storing processing results in the validation table, the dispatcher component of the updated software application may dispatch the processing results to the client interface that is accessible to client devices, may store the processing results in the data lake that is accessed by downstream components, and/or may store the processing results in the communication history (e.g., for audit purposes and/or to enable validation testing for a subsequent iteration or version of the software application).

In this way, by activating the interface between the updated publisher component and the request queue to make the request queue the source of requests for the publisher component and activating the various interfaces of the dispatcher component, the updated version may take over processing from the legacy version with minimal to no disruption to end users and no need to re-route traffic from the legacy version to the updated version. For example, end users operating one or more client devices may interact with the client interface, and any switch from the legacy version to the updated version may be transparent from a perspective of the client devices. Furthermore, there may be no need to re-route traffic from a server or cluster hosting the legacy version to a server or cluster hosting the updated version because the legacy and updated versions execute in the same runtime environment, and logic is used to switch the data pipeline to control the flow among different components. In this way, the parallel rollout verification processing (e.g., controlled by the rollout component) may cause the updated version to run silently in the same container as the legacy version in the pilot mode before configuring the updated version to take over for the legacy version in the live mode, which may eliminate a need to run the legacy and updated versions concurrently in the live (e.g., production) mode and/or provide a separate runtime environment with different stacks to run the legacy version and the updated version of the software application. In addition, the parallel rollout verification processing may eliminate a need to target certain users to help with testing the updated version of the software application or to strategically roll out the updated version of the software application to different servers and/or users.

As indicated above, FIGS. 1A-1C are provided as an example. Other examples may differ from what is described with regard to FIGS. 1A-1C.

Figure 2:
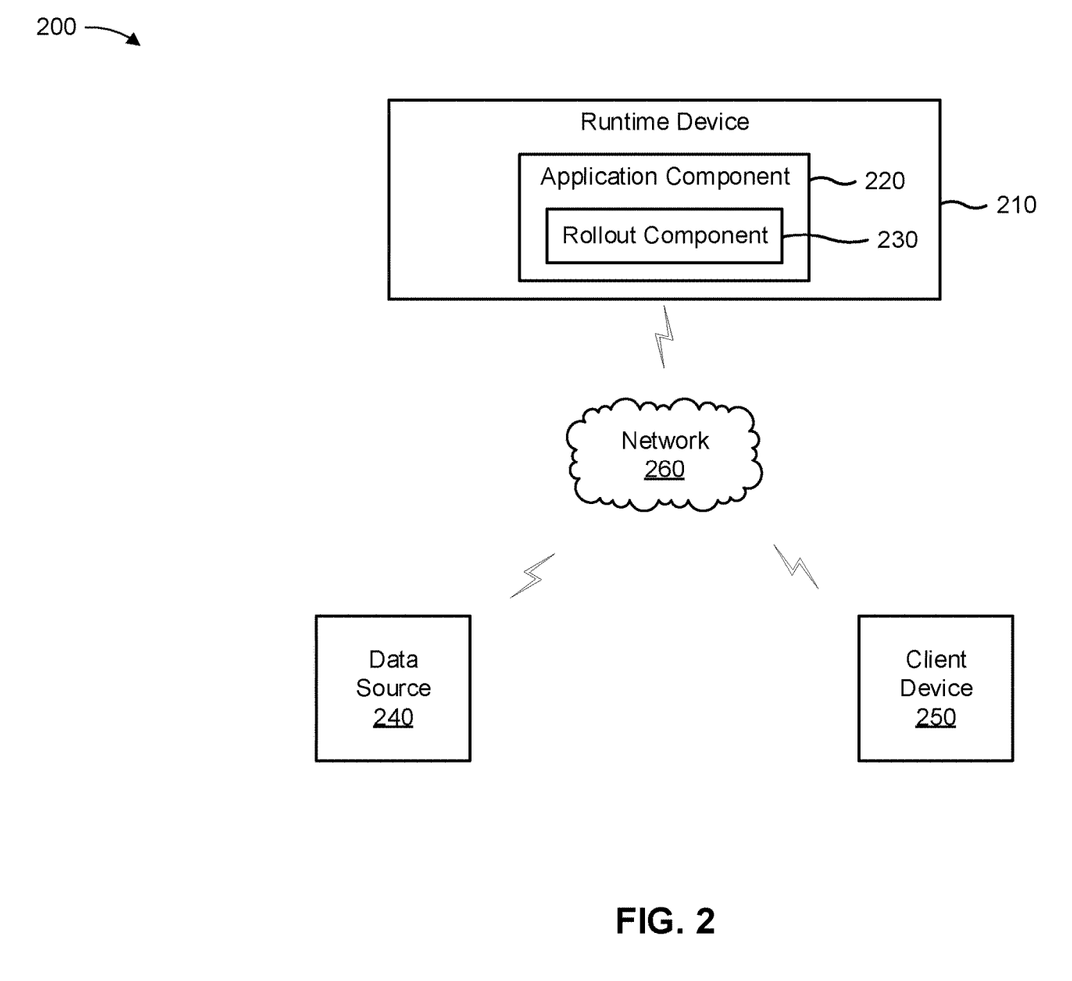
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a runtime device 210 hosting an application component 220 and a rollout component 230, a data source 240, a client device 250, and a network 260. Devices of environment 200 may interconnect via wired connections, wireless connections, or a combination of wired and wireless connections.

The runtime device 210 includes one or more devices capable of receiving, generating, storing, processing, providing, and/or routing information associated with parallel rollout verification processing for deploying updated software, as described elsewhere herein. The runtime device 210 may include a communication device and/or a computing device. For example, the runtime device 210 may include a server, such as an application server, a client server, a web server, a database server, a host server, a proxy server, a virtual server (e.g., executing on computing hardware), or a server in a cloud computing system. In some implementations, the runtime device 210 includes computing hardware used in a cloud computing environment. In some implementations, the runtime device 210 may be included in a production environment that includes one or more nodes to host the application component 220 and the rollout component 230. For example, the application component 220 may include a set of computing resources (e.g., processing resources, memory resources, and/or storage resources, among other examples) and/or interfaces between computing resources to execute a legacy version and/or an updated version of a software application. Furthermore, the rollout component 230 may include a set of computing resources to execute a rollout utility or application that can configure a data pipeline by activating, enabling, deactivating, and/or disabling one or more interfaces used to route data between and/or among different components associated with the legacy version and/or updated version of the software application.

The data source 240 includes one or more devices capable of receiving, generating, storing, processing, and/or providing information associated with parallel rollout verification processing for deploying updated software, as described elsewhere herein. The data source 240 may include a communication device and/or a computing device. For example, the data source 240 may include a database, a data repository, a server, a database server, an application server, a client server, a web server, a host server, a proxy server, a virtual server (e.g., executing on computing hardware), a server in a cloud computing system, a device that includes computing hardware used in a cloud computing environment, a device storing one or more files, a device providing one or more data streams, a device exposed by an API, or a similar type of device. The data source 240 may communicate with one or more other devices of environment 200, as described elsewhere herein.

The client device 250 includes one or more devices capable of receiving, generating, storing, processing, and/or providing information associated with parallel rollout verification processing for deploying updated software, as described elsewhere herein. The client device 250 may include a communication device and/or a computing device. For example, the client device 250 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the client device 250 may use a client interface to access a legacy version of a software application executing in the runtime device 210 when an updated version of the software application is executing in the runtime device 210 in a pilot mode, and may use the client interface to access the updated version of the software application when the updated version of the software application is executing in the runtime device 210 in a live mode.

The network 260 includes one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
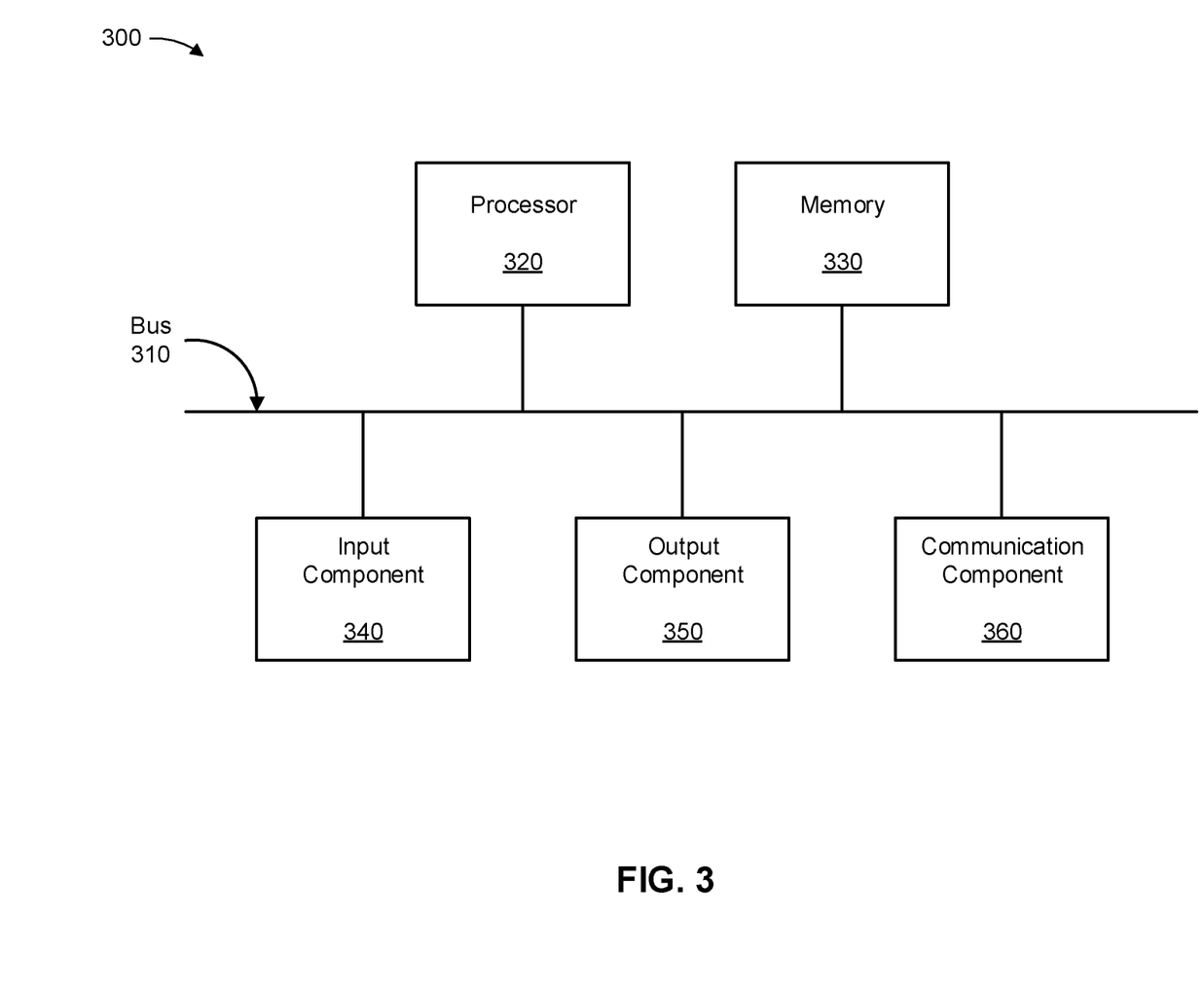
FIG. 3 is a diagram of example components of one or more devices of FIG. 2.

FIG. 3 is a diagram of example components of a device 300, which may correspond to runtime device 210, application component 220, rollout component 230, data source 240, and/or client device 250. In some implementations, runtime device 210, application component 220, rollout component 230, data source 240, and/or client device 250 may include one or more devices 300 and/or one or more components of device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
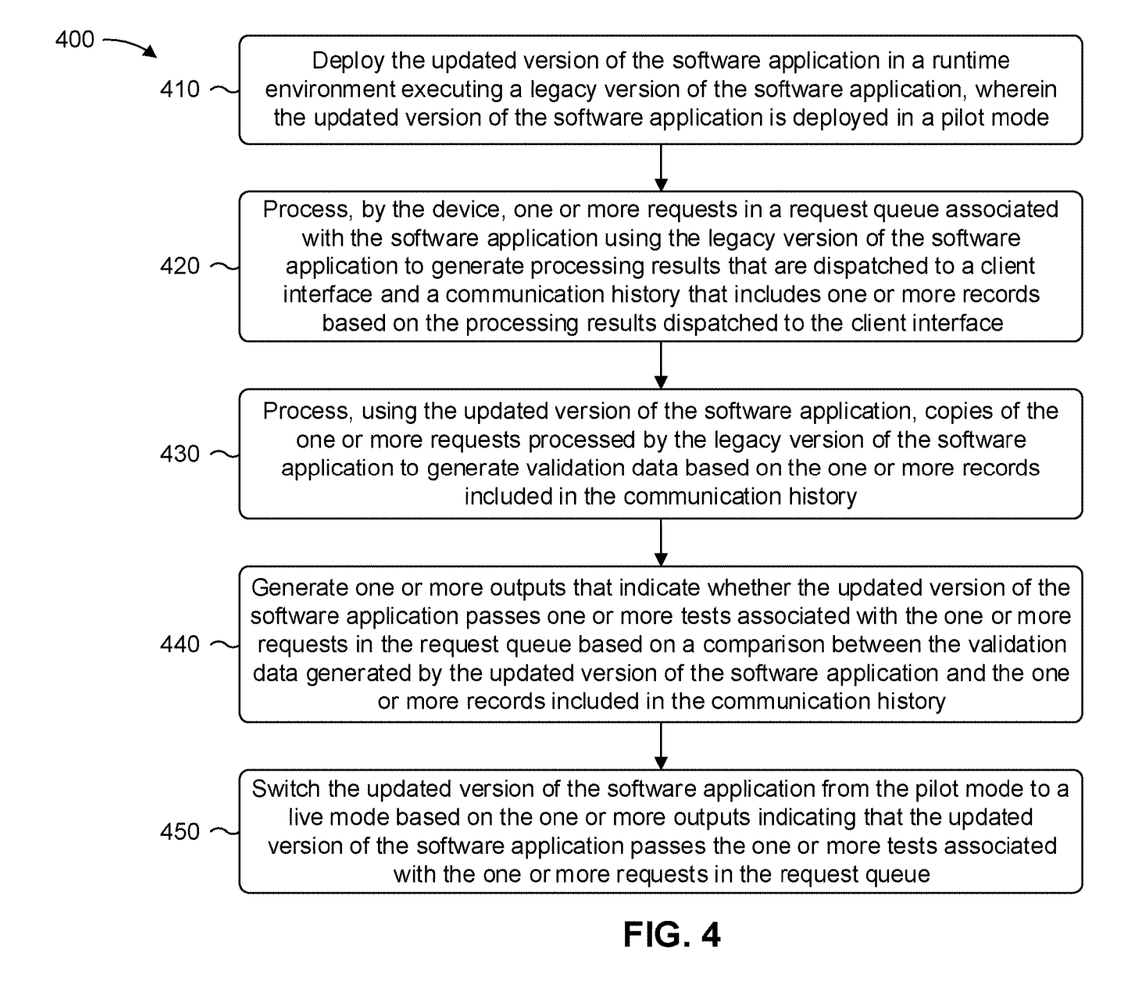
FIG. 4 is a flowchart of an example process relating to parallel rollout verification processing for deploying updated software.

FIG. 4 is a flowchart of an example process 400 associated with parallel rollout verification processing for deploying software updates. In some implementations, one or more process blocks of FIG. 4 may be performed by a rollout component (e.g., rollout component 230). In some implementations, one or more process blocks of FIG. 4 may be performed by another device or a group of devices separate from or including the rollout component, such as runtime device 210, application component 220, data source 240, and/or client device 250. Additionally, or alternatively, one or more process blocks of FIG. 4 may be performed by one or more components of device 300, such as processor 320, memory 330, input component 340, output component 350, and/or communication component 360.

As shown in FIG. 4, process 400 may include deploying the updated version of the software application in a runtime environment executing a legacy version of the software application (block 410). In some implementations, the updated version of the software application is deployed in a pilot mode. As further shown in FIG. 4, process 400 may include processing one or more requests in a request queue associated with the software application using the legacy version of the software application to generate processing results that are dispatched to a client interface and a communication history that includes one or more records based on the processing results dispatched to the client interface (block 420). As further shown in FIG. 4, process 400 may include processing, using the updated version of the software application, copies of the one or more requests processed by the legacy version of the software application to generate validation data based on the one or more records included in the communication history (block 430). As further shown in FIG. 4, process 400 may include generating one or more outputs that indicate whether the updated version of the software application passes one or more tests associated with the one or more requests in the request queue based on a comparison between the validation data generated by the updated version of the software application and the one or more records included in the communication history (block 440). As further shown in FIG. 4, process 400 may include switching the updated version of the software application from the pilot mode to a live mode based on the one or more outputs indicating that the updated version of the software application passes the one or more tests associated with the one or more requests in the request queue (block 450).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for testing and deploying an updated version of a software application, the system comprising:
   one or more memories; and
   one or more processors, coupled to the one or more memories, configured to:
   deploy, in a pilot mode, the updated version of the software application in a runtime environment executing a legacy version of the software application;
   process one or more requests in a request queue associated with the software application using the legacy version of the software application to generate processing results that are dispatched to a client interface and a communication history that includes one or more records based on the processing results that are dispatched to the client interface;
   process, using the updated version of the software application, copies of the one or more requests processed by the legacy version of the software application to generate validation data based on the one or more records included in the communication history,
      wherein the copies of the one or more requests are included in the communication history;
   store, based on determining where to dispatch the validation data based on a status of a pilot flag associated with the updated version of the software application, the validation data;
   generate one or more outputs that indicate whether the updated version of the software application passes one or more tests associated with the one or more requests in the request queue based on a comparison between the validation data generated by the updated version of the software application and the one or more records included in the communication history; and
   modify, based on the one or more outputs indicating that the updated version of the software application passes the one or more tests, a data pipeline associated with the updated version of the software application to receive inputs from the request queue instead of the communication history and to dispatch processing results based on the inputs received from the request queue to the client interface.

2. The system of claim 1, wherein the one or more processors are further configured to:
   switch the updated version of the software application from the pilot mode to a live mode based on the one or more outputs indicating that the updated version of the software application passes the one or more tests associated with the one or more requests in the request queue.

3. The system of claim 2, wherein the one or more processors, to switch the updated version of the software application from the pilot mode to the live mode, are further configured to:
   store the processing results that are based on the inputs received from the request queue in one or more data repositories that are accessible by one or more downstream components.

4. The system of claim 2, wherein the one or more processors, to switch the updated version of the software application from the pilot mode to the live mode, are further configured to:

store the processing results that are based on the inputs received from the request queue in one or more data repositories to maintain an audit data source for the processing results that are dispatched to the client interface by the updated version of the software application.

5. The system of claim 1, wherein the runtime environment includes a container to execute the legacy version of the software application and the updated version of the software application while the updated version of the software application is deployed in the pilot mode.

6. The system of claim 1, wherein the copies of the one or more requests are provided to the updated version of the software application as one or more callbacks that are based on the one or more records included in the communication history.

7. The system of claim 1, wherein the one or more processors are further configured to:
receive the one or more requests from one or more request sources,
wherein the one or more request sources include one or more data repositories, one or more data streams, one or more flat files, or one or more application program interfaces that expose one or more endpoints.

8. The system of claim 1, wherein the copies of the one or more requests correspond to one or more requests that have been successfully processed by the legacy version of the software application.

9. The system of claim 1, wherein the communication history is a source of the copies of the one or more requests for the updated version of the updated version of the software application in the pilot mode.

10. A method for testing an updated version of a software application in a live runtime environment prior to deployment, comprising:
deploying, by a device, the updated version of the software application in a runtime environment executing a legacy version of the software application,
wherein the updated version of the software application is deployed in a pilot mode;
processing, by the device, one or more requests in a request queue associated with the software application using the legacy version of the software application to generate processing results that are dispatched to a client interface and a communication history that includes one or more records based on the processing results that are dispatched to the client interface;
processing, by the device, using the updated version of the software application, copies of the one or more requests processed by the legacy version of the software application to generate validation data based on the one or more records included in the communication history,
wherein the copies of the one or more requests are included in the communication history;
storing, based on determining where to dispatch the validation data based on a status of a pilot flag associated with the updated version of the software application, the validation data;
generating, by the device, one or more outputs that indicate whether the updated version of the software application passes one or more tests associated with the one or more requests in the request queue based on a comparison between the validation data generated by the updated version of the software application and the one or more records included in the communication history; and switching, by the device, the updated version of the software application from the pilot mode to a live mode based on the one or more outputs indicating that the updated version of the software application passes the one or more tests associated with the one or more requests in the request queue,
wherein switching the updated version of the software application from the pilot mode to the live mode includes modifying a data pipeline associated with the updated version of the software application to receive inputs from the request queue instead of the communication history and to dispatch processing results based on the inputs received from the request queue to the client interface.

11. The method of claim 10, wherein switching the updated version of the software application from the pilot mode to the live mode includes:
storing the processing results that are based on inputs received from the request queue in one or more data repositories that are accessible by one or more downstream components.

12. The method of claim 10, wherein switching the updated version of the software application from the pilot mode to the live mode includes:
storing the processing results that are based on inputs received from the request queue in one or more data repositories to maintain an audit data source for the processing results that are dispatched to the client interface by the updated version of the software application.

13. The method of claim 10, wherein the runtime environment includes a container to execute the legacy version of the software application and the updated version of the software application while the updated version of the software application is deployed in the pilot mode.

14. The method of claim 10, wherein the copies of the one or more requests are provided to the updated version of the software application as one or more callbacks that are based on the one or more records included in the communication history.

15. The method of claim 10, further comprising:
receiving the one or more requests from one or more request sources,
wherein the one or more request sources include one or more data repositories, one or more data streams, one or more flat files, or one or more application program interfaces that expose one or more endpoints.

16. A non-transitory computer-readable medium storing a set of instructions, the set of instructions comprising:
one or more instructions that, when executed by one or more processors of a system, cause the system to:
deploy, in a pilot mode, an updated version of a software application in a runtime environment executing a legacy version of the software application;
process one or more requests in a request queue associated with the software application using the legacy version of the software application to generate processing results that are dispatched to a client interface and a communication history that includes one or more records based on the processing results that are dispatched to the client interface;
process, using the updated version of the software application, copies of the one or more requests processed by the legacy version of the software application to generate validation data based on the one or more records included in the communication history,
    wherein the copies of the one or more requests are included in the communication history;
store, based on determining where to dispatch the validation data based on a status of a pilot flag associated with the updated version of the software application, the validation data;
generate one or more outputs that indicate whether the updated version of the software application passes one or more tests associated with the one or more requests in the request queue based on a comparison between the validation data generated by the updated version of the software application and the one or more records included in the communication history; and
modify a data pipeline associated with the updated version of the software application based on the one or more outputs indicating that the updated version of the software application passes the one or more tests associated with the one or more requests in the request queue,
    wherein the data pipeline associated with the updated version of the software application is modified to receive inputs from the request queue instead of the communication history and to dispatch processing results based on the inputs received from the request queue to the client interface.

17. The non-transitory computer-readable medium of claim 16, wherein the one or more instructions further cause the system to:
    store the processing results that are based on the inputs received from the request queue in one or more data repositories that are accessible by one or more downstream components.

18. The non-transitory computer-readable medium of claim 16, wherein the one or more instructions further cause the system to:
    store the processing results that are based on the inputs received from the request queue in one or more data repositories to maintain an audit data source for the processing results that are dispatched to the client interface by the updated version of the software application.

19. The non-transitory computer-readable medium of claim 16, wherein the runtime environment includes a container to execute the legacy version of the software application and the updated version of the software application while the updated version of the software application is deployed in the pilot mode.

20. The non-transitory computer-readable medium of claim 16, wherein the copies of the one or more requests are provided to the updated version of the software application as one or more callbacks that are based on the one or more records included in the communication history.

* * * * *